UNITED STATES PATENT OFFICE.

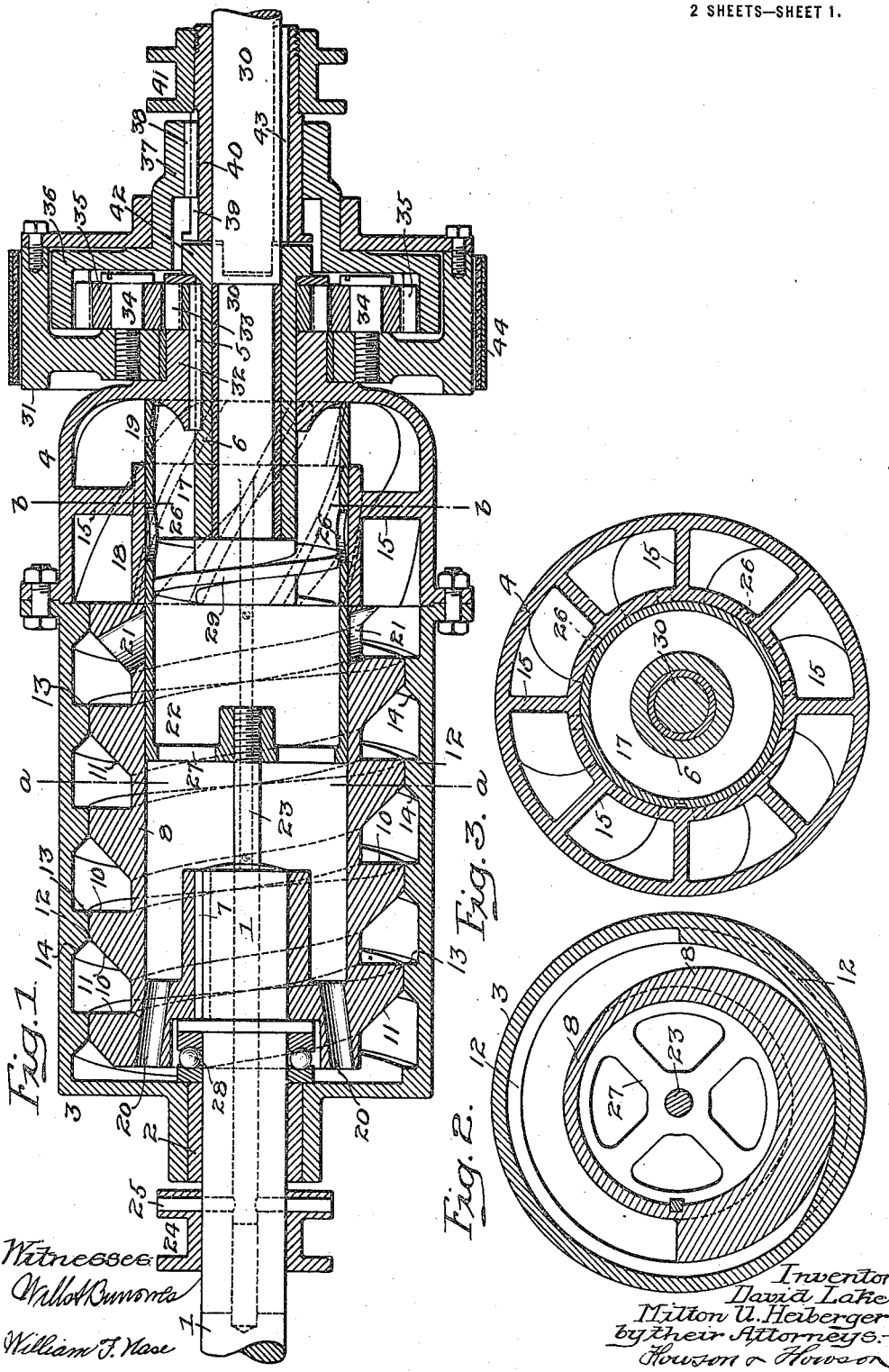

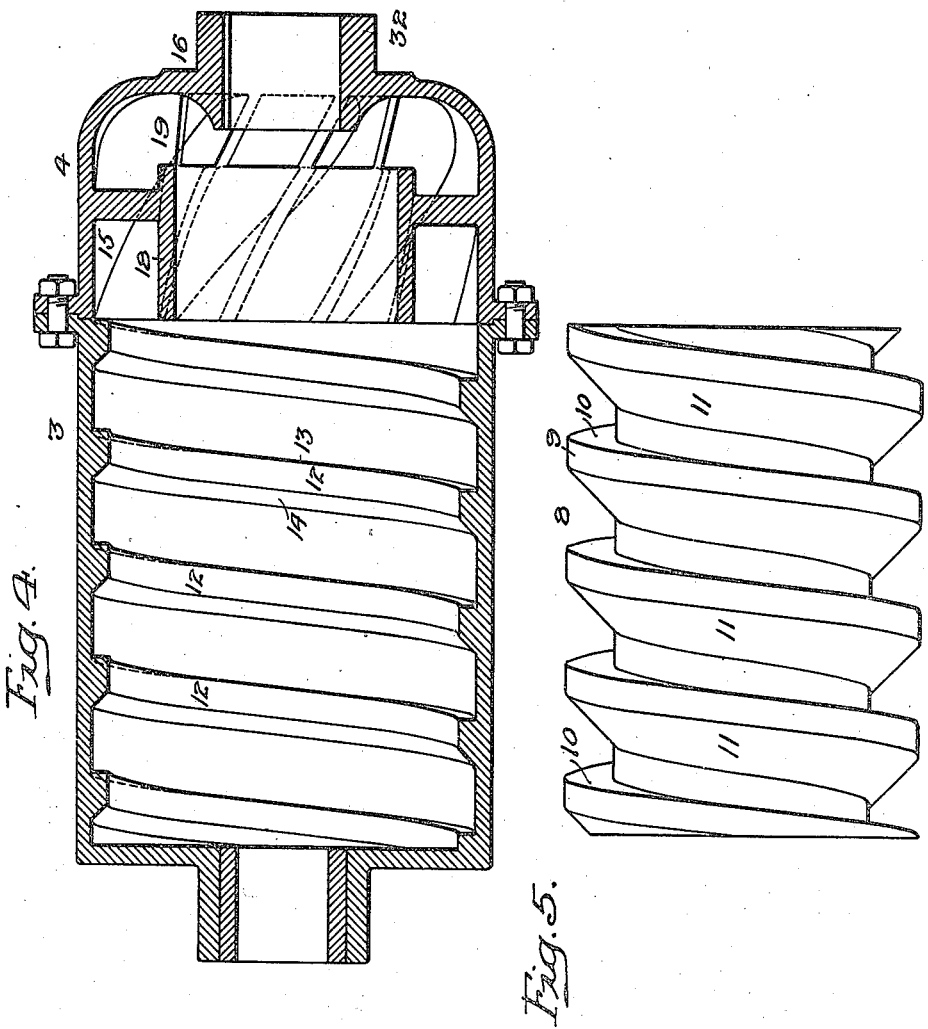

DAVID LAKE, OF JEFFERSONVILLE, AND MILTON U. HEIBERGER, OF PHILADELPHIA, PENNSYLVANIA.

FLUID-CLUTCH.

1,144,214.     Specification of Letters Patent.     Patented June 22, 1915.

Application filed May 7, 1914. Serial No. 837,059.

*To all whom it may concern:*

Be it known that we, DAVID LAKE and MILTON U. HEIBERGER, citizens of the United States, and residents of Jeffersonville, county of Montgomery, State of Pennsylvania, and Philadelphia, county of Philadelphia, State of Pennsylvania, respectively, have invented certain Improvements in Fluid-Clutches, of which the following is a specification.

The object of this invention is to improve the construction of a fluid clutch, *i. e.*, a clutch in which the power is transmitted from the driving member to the driven member through a fluid body which can be allowed to travel freely in the clutch without transmitting any power, or which will be locked in the clutch so as to transmit substantially all of the power from the driving to the driven member.

In the accompanying drawings:—Figure 1, is a longitudinal sectional view of our improved fluid clutch; Fig. 2, is a transverse sectional view on the line *a—a*, Fig. 1; Fig. 3, is a transverse sectional view on the line *b—b*, Fig. 1; Fig. 4, is a detached sectional view of the casing; and Fig. 5, is a detached view of the screw.

Referring to the drawings, 1 is the driving shaft which extends into the casing 3 through a bearing 2. This casing is bolted, or otherwise secured, to what may be termed the turbine casing 4 which is, in turn, secured by a key 5 to a hollow shaft 6, which is the intermediate driven member. Secured to the end of the shaft 1 by a key 7 is a screw 8 having an external thread 9 of the pitch illustrated in Fig. 5. This thread is straight on the forward side, as at 10, and is beveled at the rear side, as at 11. The screw 8 fits snugly within the casing 3, as clearly shown in Fig. 1, and on the interior of the casing is a screw thread 12 arranged in a spiral opposite to the thread 9 of the screw 8. This thread 12 is straight at its forward end 13 and is beveled at the rear 14, as shown. The fluid always travels in the same direction through the space between the casing and the screw, as indicated by arrows, and the screws are made so as to resist any back movement.

In the casing 4 is a series of blades 15, which are arranged at an angle and extend from the point where the casing 4 joins the casing 3 to the hub 16 which is attached to the intermediate driven member 6. The end of the casing 4 is preferably rounded, as shown, so as to guide the fluid to the annular passage 19 and return passage 17. The passage 17 is between a ring 18 on the casing 4 and the intermediate driven member 6. This ring stops short of the end of the casing 4 to form the annular passage 19.

20 is a series of passages in the screw 8, through which the fluid passes from the interior of the screw 8 to the space between the screw and the casing 3.

21 is a series of cut out passages at the outer end of the screw 8, which communicate with the space between the screw 8 and the casing 3 and the interior of the screw 8 to allow the fluid to pass to the interior of the screw without passing through the casing 4.

22 is a sliding valve fitting the interior of the screw 8 and arranged to close the passage 19, as well as the passages 21, and this valve is moved longitudinally by a rod 23 to which it is attached. This rod passes through an opening in the shaft 1 and is secured to a sleeve 24 by a transverse pin 25 adapted to travel in a slot in the shaft 1 so that, on moving this sleeve by any suitable lever mechanism, the valve can be shifted to any degree desired. In the valve is a series of ports 26 which, when the valve is moved back to its full extent, aline with passages 21 so that the fluid will pass through the passages 21 on its return, instead of passing through the casing 4 and the passage 19. The valve has a series of openings 27 at its end so as to allow the fluid to flow freely through the interior of the screw in order to make the circuit described above.

We preferably arrange a ball bearing 28, of any suitable type, between a shoulder on the shaft 1 and the casing, so as to receive the end thrust of the screw. When the valve is wide open there is no movement imparted to the casing from the screw through the fluid, as it can freely flow around the screw, passing to the outer channel through the ports 20, then back through the ports 21 to the inner channel, but, the moment the valve is moved forward to close the ports 21, the fluid is forced through the space between the blades 15 of the casing 4 and the amount of power transmitted will depend upon the location of the valve 22, which will more or less close the passage 19 in the casing 4. When the valve 22 is in the closed position, as in Fig. 1, the fluid is trapped and packs within the casing 4 and the casing 3, and the maximum amount of power will be transmitted through these parts to the intermediate driven member 6.

The material we preferably use is a graphite paste, four parts of graphite to one of glycerin, and, in order to aid in the travel of this paste through the center of the screw, we may provide a forcing screw or propeller 29, which is secured to the driven shaft 30, so that, as the shaft revolves, the screw will tend to carry the material to the rear, keeping it in circulation.

In order that the driven mechanism may be reversed so that it can be applied to automobiles and other machines, where reversal is desired, we mount a brake drum 31 on the extended hub 32 of the casing 4 and we secure to the intermediate driven member 6, through the key 5, a gear wheel 33. On the brake drum 31 are posts 34 on which are mounted pinions 35 which mesh with the gear wheel 33 and with the teeth of the internal gear wheel 36 which has a hub 37 provided with a key 38 located in a spline 39 of the tubular shaft 40 on which is a flanged collar 41 arranged to receive an operating lever of any suitable type.

In the enlarged portion 42 of the intermediate driven member 6 are notches to receive projections on the end of the tubular shaft 40, forming a positive clutch to firmly lock the tubular shaft 40 and the shaft 30, which is keyed thereto by a key 43 and to the intermediate driving member 6.

The object of this construction is to allow the driven shaft 30 to be uncoupled from the intermediate driving shaft when starting the clutch, but, as soon as motion is imparted to the intermediate driving member 6, the positive clutch can be thrown in.

When it is desired to reverse the movement of the mechanism all that is necessary is to withdraw the positive clutch and to apply a band brake 44 to the brake drum 41, thus holding the brake drum and allowing motion to be imparted to the shaft through the gearing 33, 35 and 36, which will cause the shaft to rotate in the reverse direction.

We claim:—

1. The combination in a fluid clutch, of a driving shaft; a hollow screw thereon having an external thread; a casing in which the screw is mounted; a casing forming part of the driven member and having an internal thread; ports forming communication between the interior of the screw and the space between the screw and the casing; blades on the interior of the casing at one end and means for regulating the flow of fluid.

2. The combination of a driving shaft; a hollow screw thereon having an external thread, the threads being straight at the forward end and beveled at the rear; a casing inclosing the screw and having internal threads; ports at both ends of the screw forming communication between the space between the casing and the screw and the interior of the screw; angular blades at one end of the casing and means for regulating the flow of fluid through the clutch.

3. The combination of a driving shaft; a hollow screw secured thereto; a casing inclosing the screw, said screw having external threads and the casing having internal threads cut in the opposite direction to the threads of the screw, both of said threads having abrupt forward portions and tapered rear portions; ports at both ends of the screw; angular blades at one end of the casing and means for regulating the flow of fluid through the clutch.

4. The combination of a driving shaft; a hollow screw secured thereto and having an external thread thereon; a casing having an internal thread, said casing inclosing the screw; an extension of the casing having a ring; curved blades thereon located between the ring and the casing; said last mentioned casing having a passage at the outer end thereof communicating with the interior of the screw; and a valve for regulating the openings of the passage so as to increase or diminish the power transmitted.

5. The combination of a driving shaft having a hollow screw therein with external threads; a casing inclosing said screw and having an extension with angular blades therein; said extension having an opening therein communicating with the interior of the screw; ports at the rear of the screw communicating with the space between the screw and the casing; and a cylindrical valve located in the screw and arranged to close the forward passage so as to regulate the flow of fluid in the clutch.

6. The combination of a driving shaft having a hollow screw thereon with external threads; a casing inclosing said screw and having an extension with angular blades therein, said extension having an opening therein communicating with the interior of the screw; ports at the rear of the screw communicating with the space between the screw and the casing; a cylindrical valve located in the screw and arranged to close the forward passage so as to regulate the flow of fluid in the clutch; a valve stem attached to the valve and extending through an opening in the power shaft; and a sleeve attached to the stem by which the valve is operated.

7. The combination of a driving shaft; a hollow screw secured thereto and having external threads; a casing inclosing the screw and having an internal thread; a supplemental casing having angular blades and communicating with the main casing; a ring in the latter casing stopping short of the forward end thereof and having an annular passage; a cylindrical valve within the casing arranged to close said passage; and ports at the forward and rear ends of the screw; said valve having openings arranged to aline with the forward ports of the screw when retracted.

8. The combination of a driving shaft; a hollow screw mounted thereon having an external thread; a casing inclosing said screw and having an internal thread; an extension of the casing having angular blades, said casing having a passage at the end thereof communicating with the interior of the screw; a valve for regulating the passage of fluid through the clutch; and a driven shaft having a screw thereon located within the casing so as to cause the fluid to circulate within the screw in one direction while the main screw circulates the fluid in the opposite direction.

In testimony whereof, we have signed our names to this specification, in the presence of two subscribing witnesses.

DAVID LAKE.
MILTON U. HEIBERGER.

Witnesses:
WM. E. SHUPE,
WM. A. BARR.